United States Patent [19]

Fukuyama et al.

[11] Patent Number: 4,783,108

[45] Date of Patent: Nov. 8, 1988

[54] CATCHING HEAD OF APPARATUS FOR HANDLING PARTS SUCH AS CYLINDER BLOCKS AND THE LIKE

[75] Inventors: Hiroshi Fukuyama; Tadakazu Nishikawa; Junichi Misawa; Yasuo Suzuki, all of Tokyo, Japan

[73] Assignee: Bridgestone Corporation, Tokyo, Japan

[21] Appl. No.: 62,035

[22] Filed: Jun. 11, 1987

[30] Foreign Application Priority Data

Jun. 13, 1986 [JP] Japan .................. 61-137570
Oct. 27, 1986 [JP] Japan .................. 61-255366

[51] Int. Cl.⁴ .......................... B25J 15/00; B66C 1/46
[52] U.S. Cl. ........................... 294/98.1; 901/31
[58] Field of Search ............ 294/63.2, 87.1, 93, 294/98.1, 99.1, 119.3; 57/275; 269/22; 279/2 A; 403/5; 901/31, 39

[56] References Cited

U.S. PATENT DOCUMENTS

| | | | |
|---|---|---|---|
| 2,752,191 | 6/1956 | Pierce | 294/98.1 |
| 3,085,825 | 4/1963 | Cauchois et al. | 294/98.1 X |
| 3,713,685 | 1/1973 | Ewing | 294/119.3 |
| 3,892,437 | 7/1975 | Makinen | 294/98.1 |
| 4,270,789 | 6/1981 | Cline | 294/98.1 X |

FOREIGN PATENT DOCUMENTS

| | | | |
|---|---|---|---|
| 1048820 | 1/1959 | Fed. Rep. of Germany | 294/98.1 |
| 2845094 | 5/1980 | Fed. Rep. of Germany | 294/98.1 |
| 2568161 | 1/1986 | France | 294/98.1 |
| 635028 | 11/1978 | U.S.S.R. | 294/98.1 |
| 710775 | 6/1954 | United Kingdom | 294/119.3 |

Primary Examiner—Johnny D. Cherry
Attorney, Agent, or Firm—Jordan and Hamburg

[57] ABSTRACT

The present invention provides a catching head of apparatus for catching parts, having a tube expansible by a fluid such as air, etc. hermetically fixed at both the ends thereof to a hard base end and free end, respectively, of a core member. When in use, the tube of the catching head is expanded by air to catch a part or any other object to be handled. The one end of the tube attached to the free end of the core member is fitted as folded back to the free end of the core member. A passage is formed in the base end of the core member to supply air into the tube hermetically sealed.

6 Claims, 5 Drawing Sheets

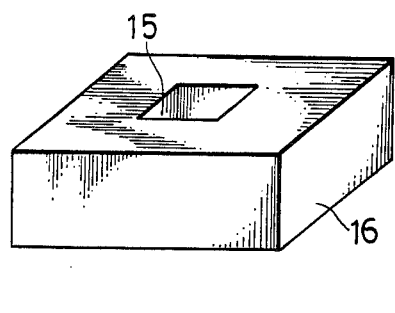
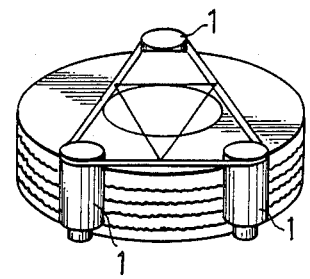
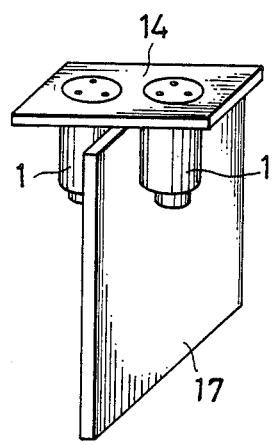
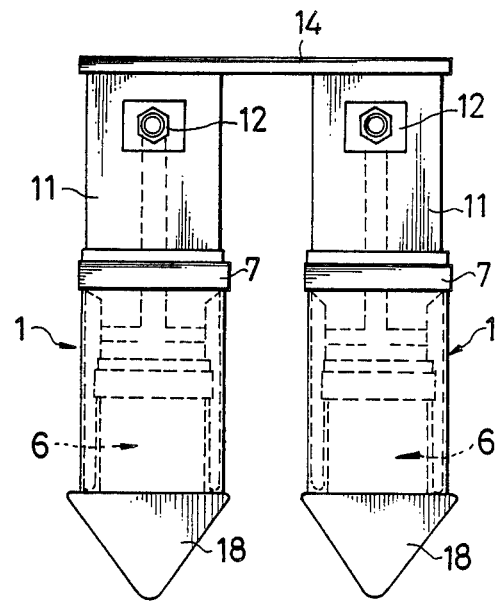

CATCHING HEAD OF APPARATUS FOR HANDLING PARTS SUCH AS CYLINDER BLOCKS AND THE LIKE

BACKGROUND OF THE INVENTION

The present invention relates to a catching head of handling apparatus suitable for catching parts such as cylinder blocks and the like.

The well-known catching head of an apparatus for handling a cylinder block comprises, as shown in FIG. 17, a cylinder 100 having connected to the plunger thereof a taper cone 101 which is to be inserted movably to and fro between metalic pawls 102 paired in such a manner that as the taper cone 101 is moved forward between the metallic pawls 102, the ends 102A of the pawls 102 are opened, and that when the taper cone 101 is moved backward between the pawls 102, the pawl ends 102A are closed. The pawl ends 102A of the metallic pawls 102 are engaged at the bottom of a cylinder block, thus catching the latter.

In such a conventional catching head of handling apparatus, the pawls are easily bent or broken, and the pawls slip and fail to catch the cylinder block in some cases. Furthermore, the pawl ends 102A are likely to damage the inner surface of the cylinder block. Also, in case the cylinder block is heavy and the metallic pawls 102 move quickly, the mechanism of the catching head of handling apparatus is disadvantageously easily broken. Moreover, such a conventional catching head of such apparatus is complicated in construction, malfunctions often and is expensive.

To catch a part which needs to be carefully handled, a catching means is known by which a flexible diaphragm such as rubber is expanded and forced into a hole formed in the part, thereby catching the latter. As shown in FIG. 18, a bag-like flexible diaphragm 103 is attached on a cylinder 104 and air is supplied through a passage 105 into the flexible diaphragm 103 which will thus be expanded to catch a part.

In the conventional catching head of handling apparatus as shown in FIG. 18, when the flexible diaphragm 103 having the end thereof introduced into a hole 107 in a thin part 106 is expanded as shown in FIG. 19, the diaphragm 103 is not securely attached to the inner circumferential surface of the hole 107, namely, the part 106 cannot be positively caught by the diaphragm 103. Also, most of such flexible diaphragms 103 use a rubber bladder formed by molding, and they cannot be greatly expanded (low in expansibility) by the air supplied into them and are poor in durability and relatively expensive. Furthermore, they are only applicable to parts of a limited range of size, and the flexible diaphragm 103 itself is relatively hard and can be used to catch only a limited range of objects to be handled.

SUMMARY OF THE INVENTION

The present invention has an object to overcome the above-mentioned drawbacks of the conventional techniques by providing a catching head of apparatus for handling parts, in which the catching head used is a tube improved in exansibility and durability and which is so soft as not to damage the part being handled and can catch it securely, and which is simple in construction, low in failure and also in manufacturing costs.

The above-mentioned object can be accomplished by providing an improved catching head of apparatus for handling parts, according to the present invention, in which a tube expansible by air supplied thereinto is hermetically fitted to both ends of a core member, the tube being fitted as folded back on the free end of the core member, a passage being formed in the base end of the core member for supplying air into the tube hermetically sealed at both the ends thereof, the tube, when in use, being expanded by air with the free end thereof inserted into a hole or recess in a part to be handled, thereby catching the part.

According to another aspect of the present invention, a tube expansible with a fluid supplied therein and in which a plurality of reinforcing cords is embedded is hermetically fitted at one end thereof on an upper portion of a cylindrical core member, the other end being folded back and hermetically fitted on a lower portion of the core member, and a passage is formed in the core member to supply a fluid into the tube, thereby expanding the latter.

According to the present invention, when the fluid is supplied into the tube through the passage, the free-end portion of the tube is expanded more greatly than the other because the tube is folded back there. This more greatly expanded portion of the tube is in contact with the part or the like being handled, so that the catching head can securely catch a thin part. Namely, the manner in which the tube expands widens the range of parts which can be caught by this catching head. Also, since the expansion of the tube is utilized, any part can be securely caught without damaging it. Furthermore, parts of any shape, if it has any hole or recess formed therein, can be caught by the catching head according to the present invention. Thus, a wider range of parts or similar objects can be effectively and efficiently handled by the handling apparatus according to the present invention. Moreover, the tube used in the catching head of the present invention has no portion imparting excessive friction, improves the durability of the catching head, and also makes the entire apparatus less expensive.

These and other objects and advantages of the present invention will be better understood from the ensuing description made by way of example of the embodiments of the catching head of handling apparatus according to the present invention with reference to the drawings.

BRIEF DESCRIPTION OF THE DRAWINGS

FIGS. 13 to 15 are perspective views, respectively, each showing an example object which can be caught by the catching head according to the present invention;

FIG. 16 is a front view showing yet another embodiment of the present invention;

DETAILED DESCRIPTION OF THE PREFERRED EMBODIMENTS

Figure 1:
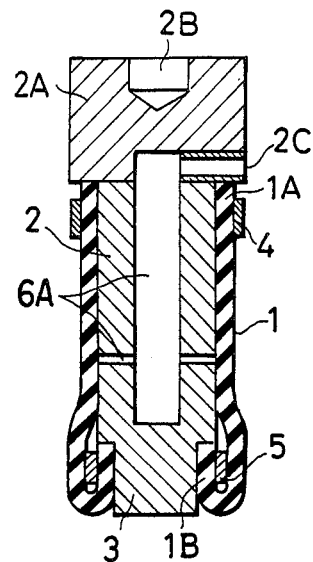
FIG. 1 is a sectional view showing a preferred embodiment of the present invention.
Figure 2:
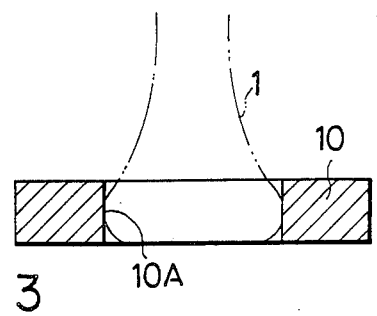
FIG. 2 is an explanatory drawing showing the catching head of FIG. 1 in a position of catching a part.

In the embodiment shown in FIG. 1, a tube 1 expansible by a fluid such as air supplied therein is hermetically fitted at both ends 1A, 1B thereof on a rigid base end 2 and free end 3, respectively, of a core member. The tube ends 1A and 1B are fastened to the core member by means of calking rings 4 and 5, respectively, and thus the ends 1A and 1B of the tube 1 are sealed air-tightly. In this embodiment, the core member having the base and free ends 2 and 3 is made of a plastic or metallic material, and there is provided at least at the base end 2 a passage 6A for supplying air into the tube 1 sealed at both ends thereof. Furthermore, a head block 2A of the base end 2 has formed therein a threaded hole 2B for fixing the catching head to the arm of a robot or handling apparatus which will be further described later, and also an air inlet 2C for supplying air to the passage 6A. The tube 1 is made of a rubber or plastic material. For catching a part 10 by means of the catching head thus constructed, the free end 3 is inserted into a hole 10A in the part 10, and air is supplied into the tube 1, thereby expanding the latter. Since the end 1B of the tube 1 at the free end 3 of the core member is folded back, the portion of the tube 1 at the free end 3 is expanded more than the other when air is supplied, so the part 10, even if it is thin as shown in FIG. 2, can be securely caught by the tube 1. In this embodiment, the tube 1 is first fitted on the free end 3 of the core member and the end 1B of the tube 1 is fastened to the free end 3 by means of the calking ring 5. Then, the tube 1 is turned back and next the other end 1A of the tube 1 is fitted and fastened with the calking ring 4 to the base end 2 of the core member so that the inner circumferential surface of the tube 1 is closely attached to the core member. The core member serves to prevent the tube 1 from deviating when expanded.

Figure 3:
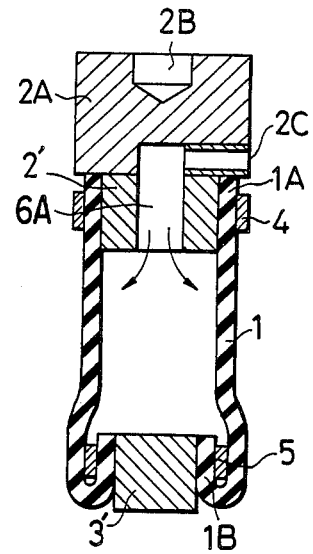
FIG. 3 is a sectional view showing another embodiment of the present invention.

FIG. 3 shows another embodiment in which the base and free ends of the core member described in the explanation made in connection with the first embodiment are provided as a first core 2' and second core 3'. Since the construction is otherwise the same as that of the first embodiment shown in FIG. 1, it will not be described any further herein.

Figure 4:
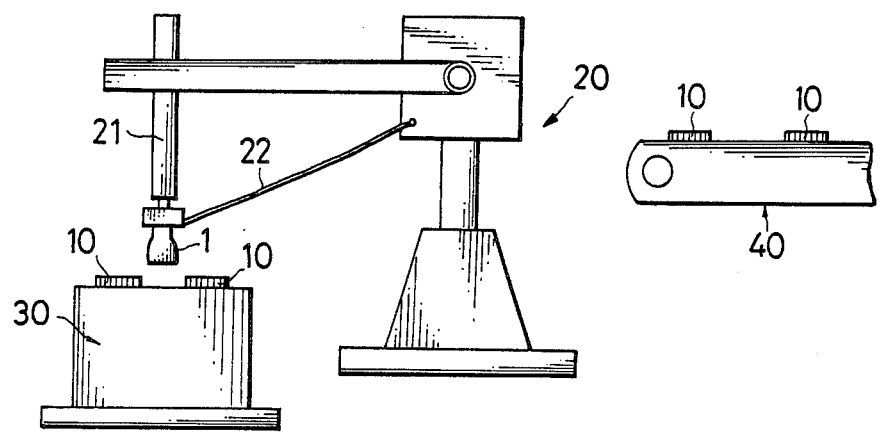
FIG. 4 is a schematic front view showing the catching head attached to the arm of a robot.

FIG. 4 shows an example use of the catching head according to the present invention as attached to an arm 21 of a robot 20. In this example, the part 10 is transferred from a work station 30 to a carrying machine 40 or vice versa by the robot 20. The catching head according to the present invention is effectively usable for transferring a soft part 10 such as a ceramic part yet to be sintered. Also, this apparatus according to the present invention can be used to transfer a product having an open mouth such as a bottle, etc. Note that the member indicated with the numeral 22 in FIG. 4 is a duct through which a fluid such as air is supplied into the tube 1.

Figure 5:
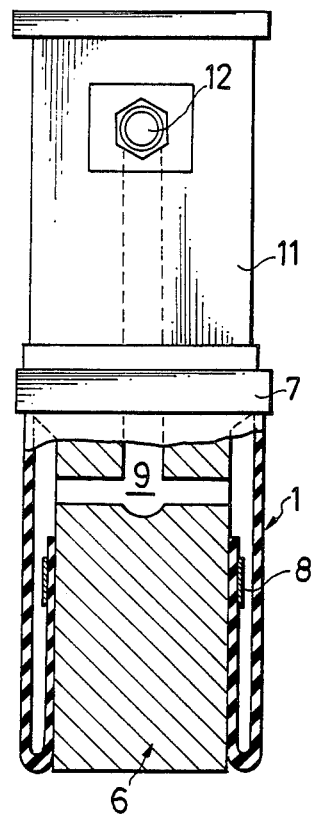
FIG. 5 is a partially framentary front view showing yet another embodiment of the present invention.

FIG. 5 shows a yet another embodiment of the present invention, in which a tube expansible when supplied with a fluid thereinto is hermetically fitted at one end thereof to an upper portion of a cylindrical rigid core member 6, the other end being folded back and hermetically fitted to a lower portion of the core member 6. The upper portion of the core member 6 corresponds to the base end 2 of the aforementioned embodiment, the lower portion of the core member 6 serving as the free end 3. The tube is fixed at the ends thereof to the core member 6 by means of calking rings 7 and 8, respectively. The core member 6 has formed therein a passage 9 through which a fluid such as air is supplied into the tube 1 sealed with the calking rings 7 and 8. The upper portion of the core member 6 is formed integrally with a head block 11 in which the passage 9 is formed and communicates with a fluid inlet 12. A pipe or duct is connected to this fluid inlet 12 for supply of air or the like into the tube.

Figure 6:
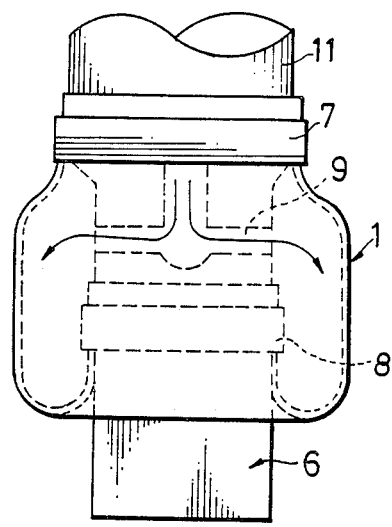
FIG. 6 is a front view showing the catching head with a fluid supplied into the tube in the embodiment shown in FIG. 5.

As a fluid is supplied through the passage 9 into the tube 1 of the catching head constructed as shown in FIG. 5, the lower end, folded-back portion of the tube 1 raises itself and is expanded laterally as shown in FIG. 6. The outer circumferential surface of the tube when expanded becomes generally parallel with the core member 6. For this approximate parallellism between the core member 6 and the outer circumferential surface of the expanded tube 1, the lower-end portion of the tube 1 should preferably be folded back more than 10% of the total length of the tube 1, and more preferably more than 25%.

Figure 7:
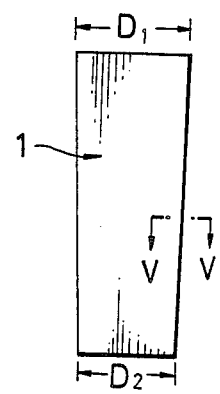
FIG. 7 is a front view of the tube used in the catching head.
Figure 8:
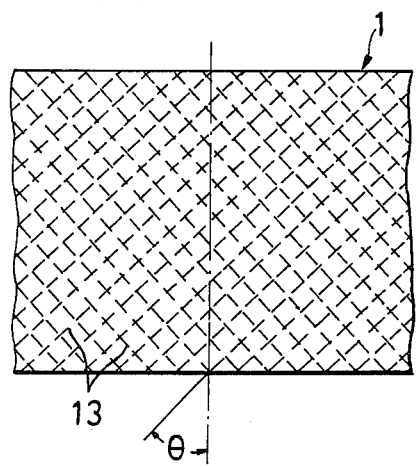
FIG. 8 is a front view showing the tube of FIG. 5 in a position where it is not folded back.
Figure 9:
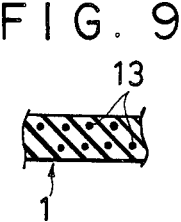
FIG. 9 is a sectional view of the tube shown in FIG. 7 taken along the line V—V of FIG. 7 and enlarged in scale.

As shown in FIG. 7, the tube 1 is formed with the diameter D1 of the upper portion thereof being larger than the diameter D2 of the lower portion, and as shown in FIGS. 8 and 9, more than two layers of reinforcing cords 13 are embedded in the tube 1. The reinforcing cords 13 are laid at an angle $\theta$ with a vertical line of the tube 1 as shown in FIG. 8. This angle is as follows:

$30° \leq \theta \leq 70°$

The material of the reinforcing cords 13 should preferably be organic fibers such as nylon, polyester fibers, etc. The tube 1 itself should preferably be made of an oil-resistant rubber such as chloroprene, etc. FIG. 9 is a sectional view, enlarged in scale, taken along the line V—V of FIG. 7, in which two layers of the reinforcing cords 13 are shown.

Figure 10:
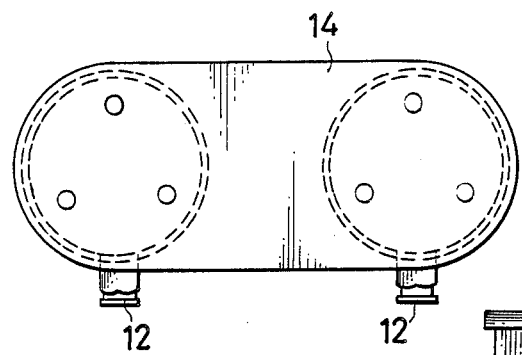
FIG. 10 is plan view showing a still another embodiment of the present invention.
Figure 12:
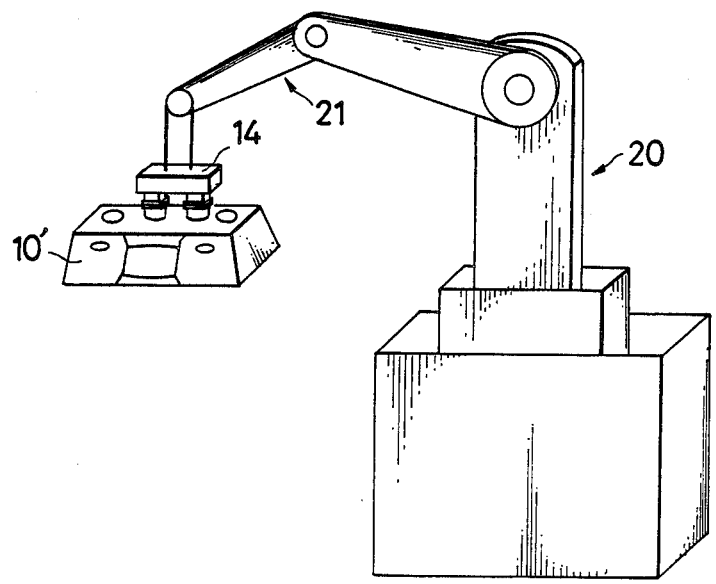
FIG. 12 is a perspective view of the catching head of FIG. 11 attached to the arm of a robot and in a position of catching a cylinder block.
Figure 17:
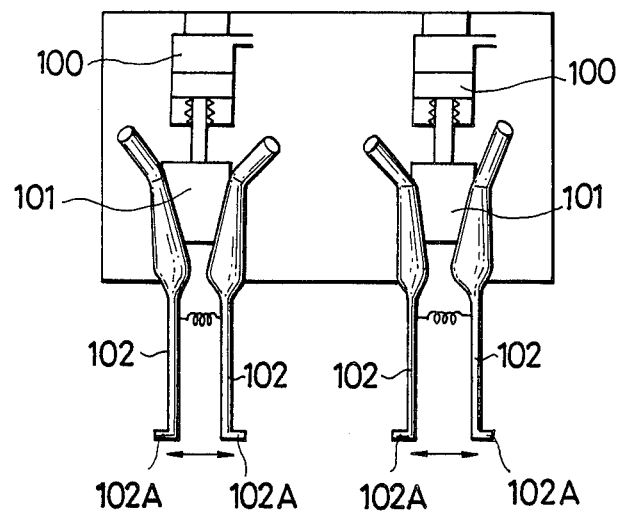
FIG. 17 is a simplified front view of a conventional catching head of handling apparatus.
Figure 18:
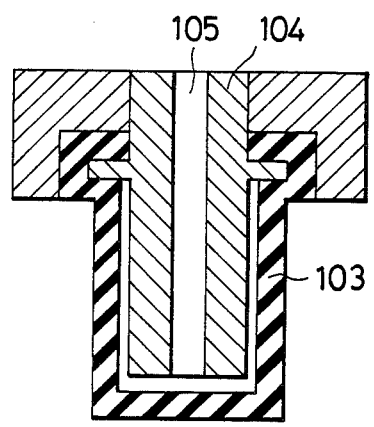
FIG. 18 is a sectional view showing another conventional catching head.
Figure 19:
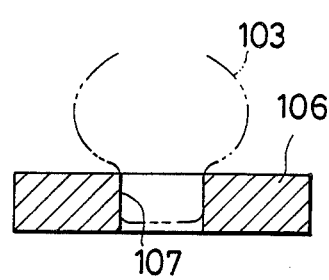
FIG. 19 is a sectional view of the conventional catching head of FIG. 18 in a position of catching a part.

FIGS. 10 and 12 show a yet further embodiment of the present invention, in which a pair of the catching heads, each comprising the tube 1, are coupled with each other by means of a coupling plate 14. As shown in FIG. 12, the coupling plate 14 is installed to the arm 21 of a robot 20 and the catching heads catch a cylinder block 10'.

FIGS. 13 to 15 each show an object which can be caught by the catching head according to the present invention. FIG. 13 shows a part 16 in which a square hole 15 is formed. When the catching head is used, the tube 1 is inserted into the square hole 15 and expanded to catch the part 16. The hole 15 may be a triangular hole, polygonal hole or an elliptical hole. The catching head according to the present invention can securely catch any part in which such a hole is provided. FIG. 14 shows the catching of a tire from outside thereof using three catching heads which are coupled to each other. FIG. 15 shows two catching heads which catch a plate-like member 17 between them.

In a still further embodiment shown in FIG. 16, there is provided at the lower end of the core member 6 an inverted conical guide 18 which may be formed integrally with the core member 6 or of course may be screwed to the latter. This guide 18 can protect the tube 1.

Figure 11:
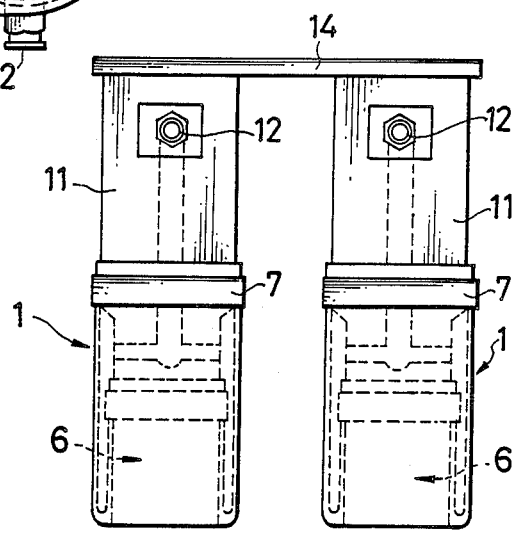
FIG. 11 is a front view of the embodiment shown in FIG. 10.

The paired catching heads shown in FIGS. 10 and 11 can catch a cylinder block 10' without damaging it. Also they can securely catch and raise a cylinder block 10' which weighs more than 50 kg. The test results show that the catching head can be operated a million times and very quickly.

What is claimed is:

1. A catching head of an apparatus for handling work pieces, comprising a tube having first and second open ends, said tube being inflatable when supplied with a fluid, a core comprising at least one rigid member and having a base end and a free end, means hermetically fitting said first end of said tube to said base end of said core, said second end of said tube being folded back inwardly toward said first end of said tube to form a folded portion, means hermetically fitting said second end of said tube onto said free end of said core with said second end of said tube being constrained only at said folded portion and being unconstrained at its extremity remote from said first end, whereby said tube extends from said second end in a direction away from said first end, and reverses at said folded portion to extend toward said first end, and inflation of said tube increases the length of said tube by extending said extremity further away from said first end, said core and the area of said tube from the means hermetically fitting said first end thereof to said base end of said core to said folded portion on said free end of said core defining a sealed fluid fillable closed chamber, and a passage in said base end of said core for supplying fluid to said closed chamber, whereby a work piece can be caught by insertion of said free end into a hole or recess of the work piece and the injection of a fluid into said passage for inflating said tube.

2. The catching head of claim 1 wherein said tube is of rubber.

3. The catching head of claim 1 wherein said tube is of a synthetic material.

4. The catching head of claim 1 wherein a plurality of reinforcing cords are embedded in said tube.

5. The catching head of claim 1 further comprising an inverse conical guide embedded attached to said free end.

6. The catching head of claim 1 wherein said core consists of first and second rigid members, each of said members comprising a respective one of said ends of said core.

* * * * *